UNITED STATES PATENT OFFICE.

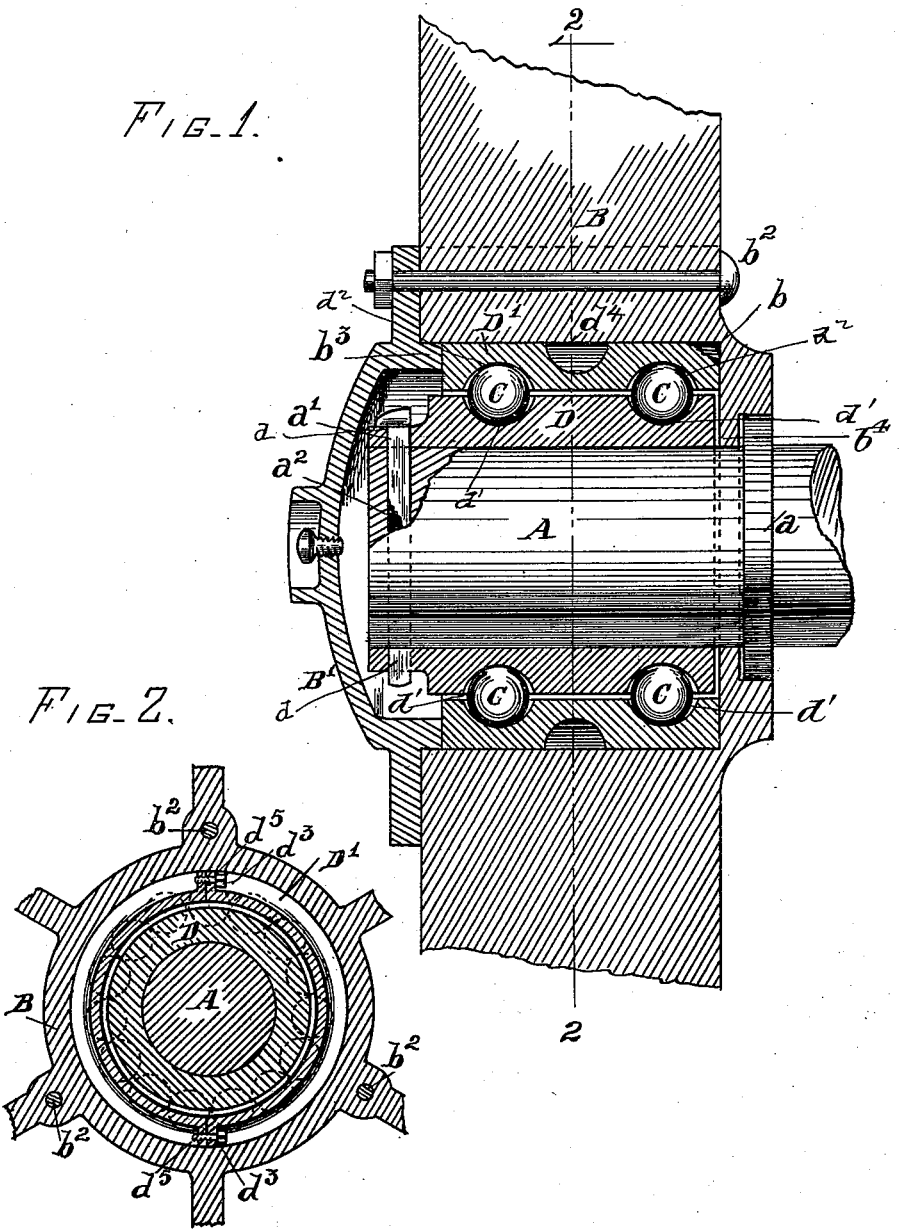

IRVING BARKER, OF SPRINGFIELD, ILLINOIS.

BALL-BEARING.

SPECIFICATION forming part of Letters Patent No. 595,933, dated December 21, 1897.

Application filed May 26, 1897. Serial No. 638,265. (No model.)

*To all whom it may concern:*

Be it known that I, IRVING BARKER, a citizen of the United States, residing at Springfield, in the county of Sangamon and State of Illinois, have invented certain new and useful Improvements in Ball-Bearings, of which the following is such a full, clear, and exact description as will enable others skilled in the art to which it appertains to make and use my said invention.

My invention relates particularly to ball-bearings of that class adapted to be used on mine-cars or other similar vehicles; and the purposes of my invention are to provide a ball-bearing so constructed and arranged that it may be applied to the axles of mine-cars or other vehicles such as are now in common use without necessitating any change in said axles; to provide a ball-keeper having hardened surfaces with which the balls contact, said ball-keeper being so constructed and arranged that the keeper and the contained balls may be conveniently inserted in or removed from the hub of the wheel; to provide a ball-keeper having hardened bearing-surfaces with which the balls contact, said ball-keeper consisting of two members between which balls are interposed, one of said members being stationary and the other being rotatable, substantially as hereinafter set forth; to provide a ball-keeper having two members between which balls are interposed, one of said members being stationary and the other being rotatable, said stationary member being adjustable on the axle in such manner that different parts of the bearing-surface thereof may be successively subjected to the severest wear of the balls and the position of said rotatable member being changeable or reversible within the bore of the wheel in such manner that different parts of the bearing-surfaces of the channels therein may be successively subjected to the severest wear of the balls; to provide a ball-keeper consisting of two members, one stationary and the other rotatable, said members having continuous annular channels adapted to accommodate balls interposed between said members, said ball-keeper being so constructed and arranged as to permit and limit slight movement of the wheel longitudinally with respect to the axle in order that the wheel may not bind on the rail while turning curves or passing irregularities in the track due to difference in gage of the track or to slight obstructions on the rail, and to provide simple and effective means for firmly retaining one member of the ball-keeper within the hub of the wheel.

With these ends in view my invention consists in certain novel features of construction and combinations of parts shown in the annexed drawings, to which reference is hereby made, and hereinafter particularly described and claimed.

In the drawings I have illustrated my invention as applied to a mine-car and have shown only so much of the car wheel and axle as is necessary to illustrate the connection of my improvements therewith.

While I have found it convenient to illustrate my improvements as applied to a mine-car, it is obvious that they may be applied to other and different vehicles, or the arrangement of parts may be reversed and the box made stationary and the axle revoluble without departing from the spirit or sacrificing any of the advantages of my invention.

Referring to the drawings, Figure 1 is a vertical longitudinal axial section through the box of a car-wheel, and Fig. 2 is a reduced partial transverse section through the box and axle on the line 2 of Fig. 1.

Similar letters of reference designate like parts in both of the views.

The axle A and the collar $a$, which is preferably shrunk on the axle, are of the usual well-known forms. The wheel B is also of a common and well-known form.

In the hub of the wheel B is a central bore $b$, within which the outer member $D'$ of the ball-keeper fits snugly, as hereinafter set forth. In the hub of the wheel is an internal annular flange $b^4$, which partially fills the space between the collar $a$ and the adjacent end of the sleeve D and in conjunction with the collar and the sleeve serves to limit the longitudinal movement of the wheel on the axle, as hereinafter set forth.

The ball-keeper consists of two members— viz., an inner member or sleeve D, fitting on the axle A, and an outer member or shell $D'$, fitting in the bore $b$ of the wheel B. In the sleeve D are a series of transverse holes $d$, adapted to receive a linchpin $a'$, by means of which the sleeve is detachably connected with and adjusted on the axle.

When the wheel is in use, most of the pressure and friction due to the weight of the vehicle and its load is applied to the sleeve through the balls running in the lower quadrant of the sleeve. Hence the wear on that part of the sleeve is greater than on the other parts thereof. By providing a series of diametrically-opposite holes $d$ through the sleeve adapted to receive the linchpin connecting the sleeve with the axle it is obvious that by turning the sleeve so as to bring different pairs of holes in registry with the hole $a^2$ through the axle and then inserting the linchpin in the registering holes the sleeve may be so adjusted on the axle as to successively bring different parts of the sleeve into position to receive the greatest wear, thereby distributing the wear evenly over the bearing-surface of the sleeves and rendering the sleeve serviceable much longer than it otherwise would be.

In case the box is stationary on the vehicle and the wheels are secured to the axle and the axle turns in the box in a usual and well-known manner it is obvious that the severest friction and wear will be on the bearing-surface in the upper quadrant of the box. In this case the shell $D'$ within the box may be turned in such manner as to change the position of the shell within the box, so as to bring different parts of the surfaces of the channels $d^2$ of the shell into position to receive the severest wear, thereby greatly increasing the serviceability of the box. This may be done by removing the cap of the box, which presses against the end of the shell and serves to keep the shell in position in the box, then turning the shell as may be desired, and then securing the cap so as to press against and hold the shell in its new position within the box, as hereinafter more fully explained.

In the periphery of the sleeve D are two circumferential channels $d'$.

In the inner part of the shell $D'$ are two circular channels $d^2$, which register with the channels $d'$ in the sleeve D.

When the channels $d'$ and $d^2$ are in juxtaposition, as shown in Fig. 1, they form ways in which the balls C travel, said ways being in cross-section approximately elliptical in form, so as to allow slight rolling of the balls in a direction transverse to the ways in order to permit slight longitudinal movement of the wheel on the axle, so that the wheel will not bind on the rail in turning curves or in passing slight obstructions on the rail and so that the wheel may readily adapt itself to slight differences in gage of the track on which it may be running. The shell $D'$ may be made in two or more sections which may be united by any suitable means, so as to surround and inclose the balls C, lying in the channels $d'$, in such manner that the sleeve D, the shell $D'$, and the interposed balls C may all be simultaneously inserted in or removed from the bore of the wheel or the bore of a box, as the case may be, without displacing the balls.

In its preferable form the shell $D'$ consists of two semicircular sections united at their abutting edges by screw-bolts $d^3$. In each section of the shell $D'$ is a peripheral channel $d^4$, which is closed by transverse webs $d^5$, through which the screw-bolts which unite the sections pass. This construction enables me to materially reduce the weight of the shell without impairing its strength. It also permits the bolts uniting the sections to be so placed that the heads of the bolts will not project beyond the periphery of the shell. The practical advantage of this construction is obvious, for if the bolt-heads were to project beyond the periphery of the shell they would interfere with the insertion of the shell into the bore of the hub, and they would also be likely to bruise or otherwise injure the hands of the person having occasion to handle the shell.

When the sleeve D is within the shell $D'$ and the channels $d'$ and $d^2$ are in registry, they form ways adapted to accommodate balls. Said sleeve and shell together form a keeper which serves to prevent scattering of the balls, and the keeper and the inclosed balls may be readily inserted in or removed from the bore of the wheel.

The cap $B'$, which is secured to the wheel B by bolts $b^2$, has an internal ledge $b^3$, which abuts against the outer end of the shell $D'$, and when the bolts are tightened the pressure of the ledge against the shell serves to hold the shell firmly in the bore $b$, so that the shell will rotate with the wheel.

In case a rotatable shaft is used and the shell is placed in the box or hanger in which the shaft turns the cap would be secured to the box or hanger instead of being secured to the wheel, and the ledge of the cap would press against the end of the shell in the identical manner already described.

The collar $a$ on the axle serves to limit inward longitudinal movement of the wheel on the axle by reason of the flange $b^4$ engaging with the collar when the wheel slides inward, and the sleeve D, connected with the axle by the linchpin, serves to limit outward longitudinal movement of the wheel on the axle by reason of the flange $b^4$ engaging with the end of the sleeve when the wheel slides outward on the axle. In case a stationary box and rotatable axle are employed the collar on the shaft and the sleeve connected with the shaft will respectively serve to limit the longitudinal outward movement and the longitudinal inward movement of the shaft.

In assembling the parts the sleeve D is placed between the two sections of the shell $D'$, so that the channels $d'$ and $d^2$ register with each other, the upper edges of the sections of the shell being sufficiently separated to admit the balls. The balls are then inserted in the ways between the sleeve and the shell, and the screw-bolts $d^3$ are screwed up to hold the sections together. The wheel is then placed on the axle. The keeper containing the balls is then placed on the axle within the bore of the wheel. The linchpin is then inserted in the registering holes through the sleeve and the axle to retain the keeper on the axle, and the cap is then secured to the wheel with the internal ledge of the cap abutting against the outer edge of the shell, so as to prevent rotation of the shell within the bore of the hub.

I am aware that a circumferentially-channeled sleeve on an axle has heretofore been used. I am also aware of the prior use of an internally-channeled shell in the hub of a wheel surrounding a sleeve. I therefore do not claim those features broadly, but restrict my claims to the forms of construction and combinations of parts pointed out in the claims.

Having fully described my invention, what I claim as new, and desire to secure by Letters Patent, is—

1. In a ball-bearing the combination of an axle, a circumferentially-channeled sleeve detachably connected with and reversible on said axle in such manner that different parts of the surface of said sleeve may be successively subjected to the severest wear, a wheel having a central bore and revoluble around said axle, an internally-channeled shell fitting in the bore of said wheel and changeable therein so as to successively subject different parts of the bearing-surfaces of the channels in said shell to the severest wear of the balls, a detachable cap retaining said shell in said wheel, and balls fitting in ways formed by the juxtaposition of the channels in said shell and said sleeve, as set forth.

2. In a ball-bearing, the combination of an axle provided with a collar; a circumferentially-channeled sleeve detachably connected with said axle, said sleeve and the collar on said axle respectively serving to limit the outward longitudinal movement and the inward longitudinal movement of said wheel on said axle; a wheel revoluble around said axle, and having a central bore, also having an internal flange between said sleeve and the collar on said axle; an internally-channeled shell fitting in the bore of said wheel; balls fitting in transversely-elliptical ways formed by the juxtaposition of the channels in said sleeve and said shell; and a cap connected with said wheel and bearing against and securing said shell in the bore of said wheel, as set forth.

In witness whereof I have hereunto subscribed my name, at Springfield, Illinois, this 22d day of May, 1897.

IRVING BARKER.

Witnesses:
SAML. D. SCHOLES,
D. C. BROWN.

Correction in Letters Patent No. 595,933.

It is hereby certified that in Letters Patent No. 595,933, granted December 21, 1897, upon the application of Irving Barker, of Springfield, Illinois, for an improvement in "Ball-Bearings," an error appears in the printed specification requiring correction, as follows: Page 3, line 28, the word "reversible" should read *adjustable;* and that the said Letters Patent should be read with this correction therein that the same may conform to the record of the case in the Patent Office.

Signed, countersigned, and sealed this 1st day of February, A. D., 1898.

[SEAL.]
WEBSTER DAVIS,
*Assistant Secretary of the Interior.*

Countersigned:
   A. P. GREELEY,
      *Acting Commissioner of Patents.*